US010256653B2

United States Patent
Yoon et al.

(10) Patent No.: US 10,256,653 B2
(45) Date of Patent: Apr. 9, 2019

(54) ELECTRONIC DEVICE AND METHOD FOR CHARGING BATTERY

(71) Applicant: Samsung Electronics Co., Ltd., Gyeonggi-do (KR)

(72) Inventors: Sung-Geun Yoon, Gyeonggi-do (KR); Chul-Woo Park, Suwon-si (KR); Ku-Chul Jung, Seoul (KR); Hyun-Deok Seo, Gyeonggi-do (KR); Min-Jeong Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/483,388

(22) Filed: Apr. 10, 2017

(65) Prior Publication Data

US 2017/0294793 A1 Oct. 12, 2017

(30) Foreign Application Priority Data

Apr. 12, 2016 (KR) .......................... 10-2016-0045039

(51) Int. Cl.
*H02J 7/00* (2006.01)
*H02J 7/04* (2006.01)

(52) U.S. Cl.
CPC .......... *H02J 7/0072* (2013.01); *H02J 7/0045* (2013.01); *H02J 7/045* (2013.01); *H02J 7/047* (2013.01);
(Continued)

(58) Field of Classification Search
CPC ................. H02J 7/0072; H02J 7/045
(Continued)

(56) References Cited

U.S. PATENT DOCUMENTS 6,577,104 B2 * 6/2003 Sakakibara ........... H02J 7/0031
320/132
7,581,119 B2 * 8/2009 Tupman .................. G06F 1/266
713/300
(Continued)

FOREIGN PATENT DOCUMENTS

JP 2011-176959 A 9/2011
KR 10-1359091 B1 2/2014
WO 2015-069534 A1 5/2015

OTHER PUBLICATIONS

International Search Report, dated Jul. 11, 2017.

*Primary Examiner* — M'Baye Diao
(74) *Attorney, Agent, or Firm* — Cha & Reiter, LLC

(57) ABSTRACT

Provided are a battery charging method and an electronic device. The electronic device includes a connector that includes a first terminal to which a voltage is applied by an external charger and a second terminal for transmitting and receiving data, and a first charging circuit configured to charge a battery of the electronic device by using the voltage applied to the first terminal. The first charging circuit may include a communication circuit configured to transmit information related to the battery through the second terminal, a voltage converter configured to convert a voltage supplied to the battery and a first controller circuit configured to obtain first information regarding a voltage of the battery, control the communication circuit to transmit the first information to a charger connected with the connector, and control the voltage converter to charge the battery using a voltage adjusted based on the first information by the charger, if the adjusted voltage is applied to the first terminal.

20 Claims, 12 Drawing Sheets

(52) U.S. Cl.
CPC ............. *H02J 2007/0062* (2013.01); *H02J 2007/0095* (2013.01); *H02J 2007/0096* (2013.01)

(58) Field of Classification Search
USPC ....................................... 320/107
See application file for complete search history.

(56) References Cited

U.S. PATENT DOCUMENTS

| | | | | |
|---|---|---|---|---|
| 8,063,618 | B2* | 11/2011 | Lam | G06F 1/26 |
| | | | | 323/282 |
| 8,350,522 | B2* | 1/2013 | Johnson | G06F 1/266 |
| | | | | 320/107 |
| 2007/0224461 | A1 | 9/2007 | Oh | |
| 2009/0184688 | A1 | 7/2009 | Kim et al. | |
| 2009/0243520 | A1* | 10/2009 | Kashiwabara | H02P 25/032 |
| | | | | 318/127 |
| 2012/0007546 | A1 | 1/2012 | Eager et al. | |
| 2014/0070625 | A1* | 3/2014 | Kim | H01F 38/14 |
| | | | | 307/104 |
| 2014/0347001 | A1 | 11/2014 | Sporck et al. | |
| 2014/0361740 | A1* | 12/2014 | Suzuki | H02J 7/0027 |
| | | | | 320/108 |
| 2014/0375256 | A1* | 12/2014 | Lee | H02J 5/005 |
| | | | | 320/108 |
| 2015/0246618 | A1 | 9/2015 | Kadie | |
| 2015/0270733 | A1 | 9/2015 | Inha et al. | |
| 2016/0241052 | A1* | 8/2016 | Yang | H02J 7/0021 |
| 2016/0294198 | A1* | 10/2016 | Poulis | H01M 10/441 |
| 2017/0163069 | A1* | 6/2017 | Morikawa | G01R 31/36 |

* cited by examiner

ELECTRONIC DEVICE AND METHOD FOR CHARGING BATTERY

CLAIM OF PRIORITY

This application claims the benefit under 35 U.S.C. § 119(a) of a Korean patent application filed in the Korean Intellectual Property Office on Apr. 12, 2016 and assigned Serial No. 10-2016-0045039, the entire disclosure of which is incorporated herein by reference.

TECHNICAL FIELD

The present disclosure relates generally to an electronic device and a method for charging a battery of the electronic device, and in particular, for charging the battery based on information associated with the battery.

BACKGROUND

Recently, the use of electronic devices that are easy to carry (portable), such as smart phones, tablet personal computers (PCs), wearable devices, etc., has proliferated, and the electronic devices are configured to perform various functions. For example, a variety of functions such as voice communication, Internet search, still and video photography, music playback, video watching, etc., may be performed in the electronic devices. In such portable devices, power is supplied through internal batteries. Naturally, power consumption of the batteries increases as the number of functions being performed rises.

To lengthen the use time of the electronic devices along with the increasing power consumption, the capacities of the batteries have recently increased. To charge the internal batteries, chargers such as travel adaptors (TAs) which supply charge to the device through a universal serial bus (USB) cable have been used.

As stated above, due to the increasing capacity of the battery, the time required for charging the battery has also risen. To shorten the charging time of the battery, the battery may be charged with high power by raising a voltage of the charger. However, if high power is supplied to charge the battery, heat emission may occur in a charging unit within the electronic device for charging the battery, increasing power loss and thus lowering charging efficiency.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure are made to solve the foregoing or other problems, and provide an electronic device and a method for charging a battery of the electronic device based on information associated with the battery.

According to various embodiments of the present disclosure, there is provided an electronic device including a connector that includes a first terminal to which a voltage is applied by an external charger and a second terminal for transmitting and receiving data, and a first charging circuit configured to charge a battery of the electronic device by using the voltage applied to the first terminal. The first charging circuit may include a communication circuit configured to transmit information related to the battery through the second terminal, a voltage converter configured to convert a voltage supplied to the battery and a first controller circuit configured to obtain first information regarding a voltage of the battery, control the communication circuit to transmit the first information to a charger connected with the connector, and control the voltage converter to charge the battery using a voltage adjusted based on the first information by the charger, if the adjusted voltage is applied to the first terminal.

According to various embodiments of the present disclosure, there is provided a battery charging method by an electronic device which includes a connector including a first terminal to which a voltage is applied by an external charger and a second terminal for transmitting and receiving data and a first charging circuit configured to charge a battery of the electronic device by using the voltage applied to the first terminal. The battery charging method may include obtaining first information regarding a voltage of the battery, transmitting the first information to a charger connected with the connector through the second terminal, and charging the battery using a voltage adjusted based on the first information by the charger, if the adjusted voltage is applied to the first terminal.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
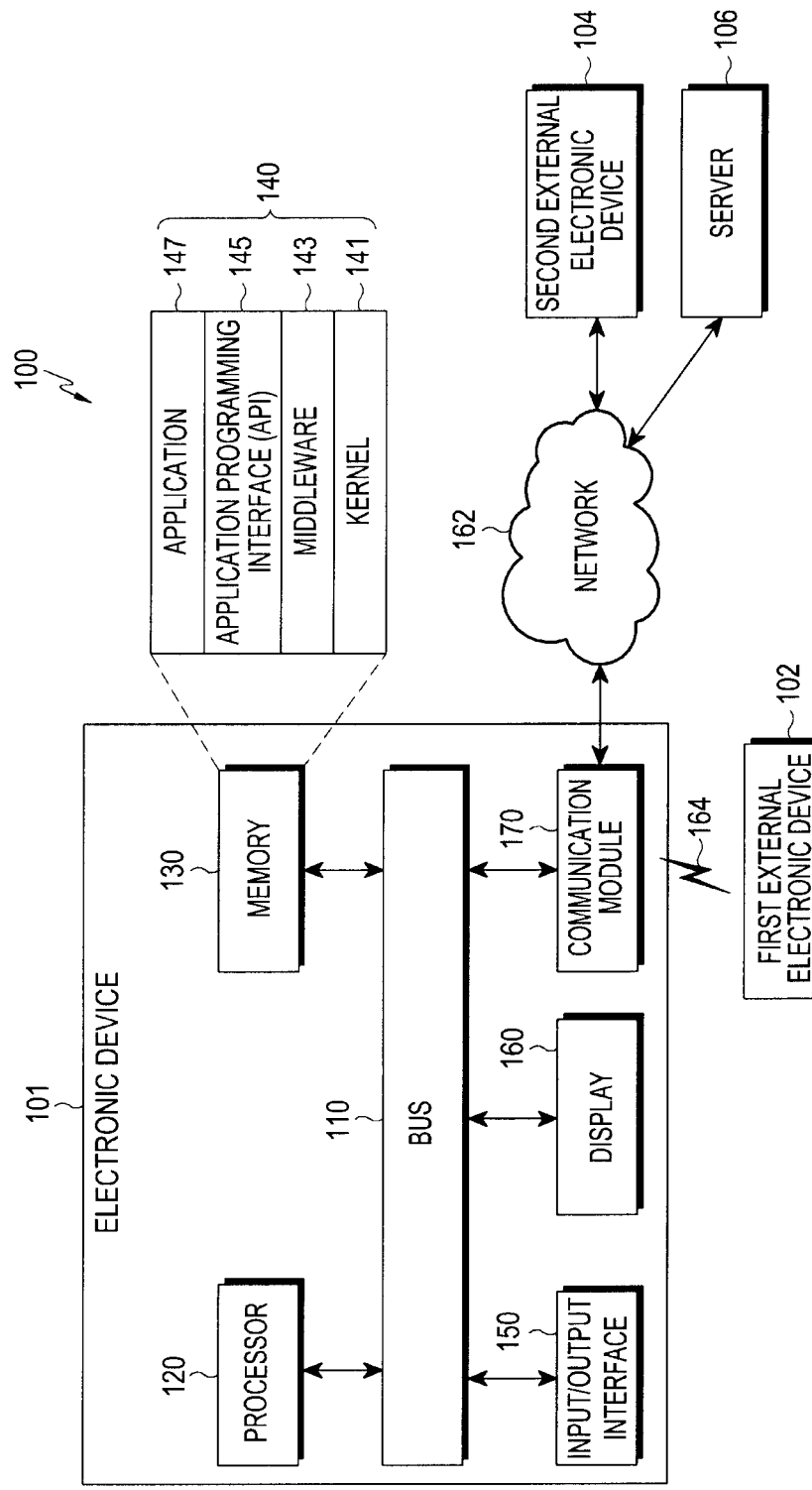
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. In regard to the description of the drawings, like reference numerals refer to like elements. The singular forms are intended to include the plural forms as well, unless the context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situations, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. The electronic device according to an embodiment of the present disclosure is not limited to the aforementioned devices. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include, for example, wireless communication 164. The wireless communication 164 may include at least one of Wireless Fidelity (WiFi), Bluetooth, Bluetooth Low Energy (BLE), ZigBee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of USB, HDMI, RS-232, power line communication, and POTS. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
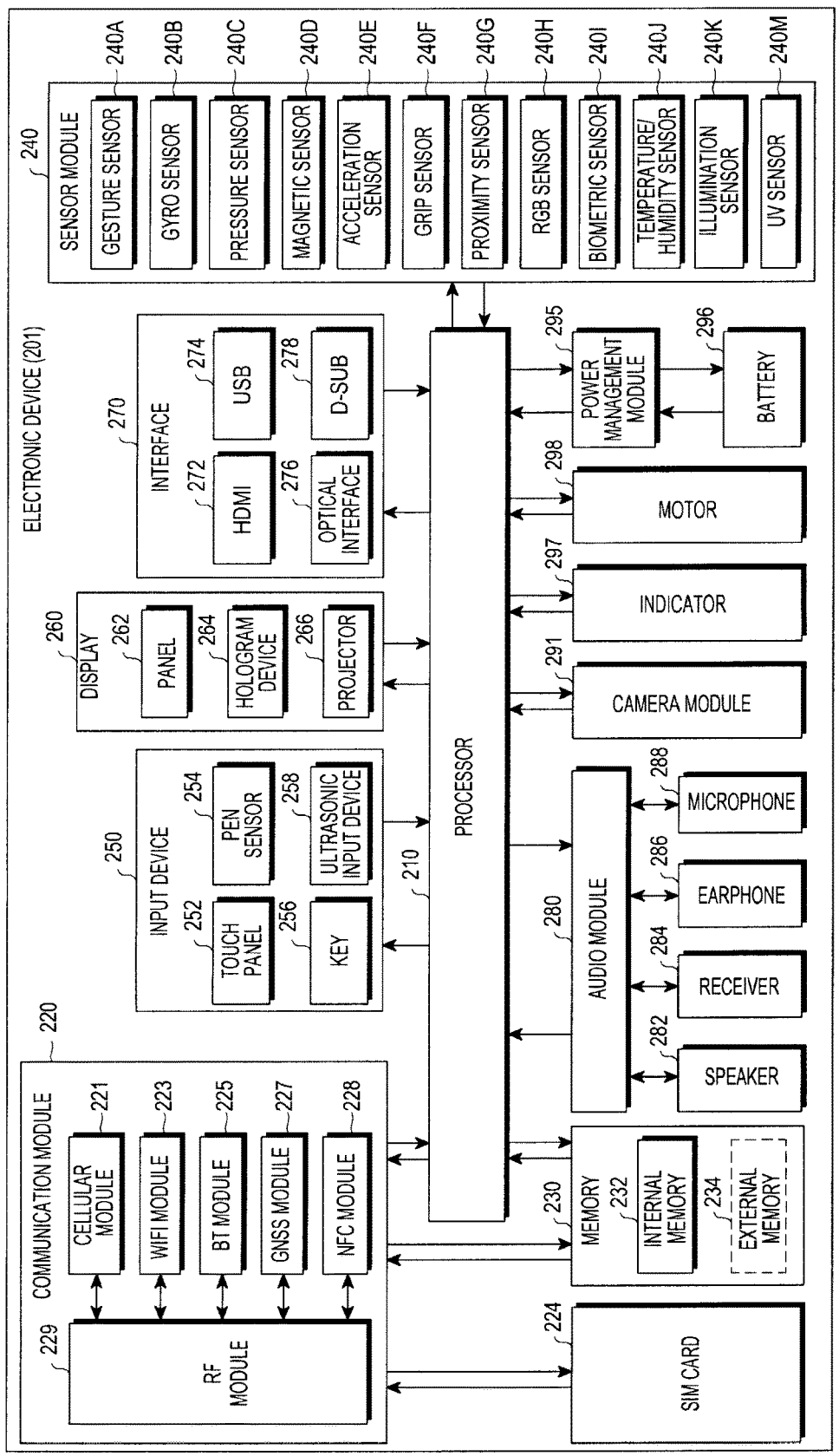
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an Operating System (OS) or an application program, and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including an SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 shows a stereoscopic image in the air by using interference of light. The projector 266 displays an image onto an external screen through projection of light. The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 bi-directionally converts sound and an electric signal. At least one element of the audio module 280 may be included in the I/O interface 150 illustrated in FIG. 1. The audio module 280 processes sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
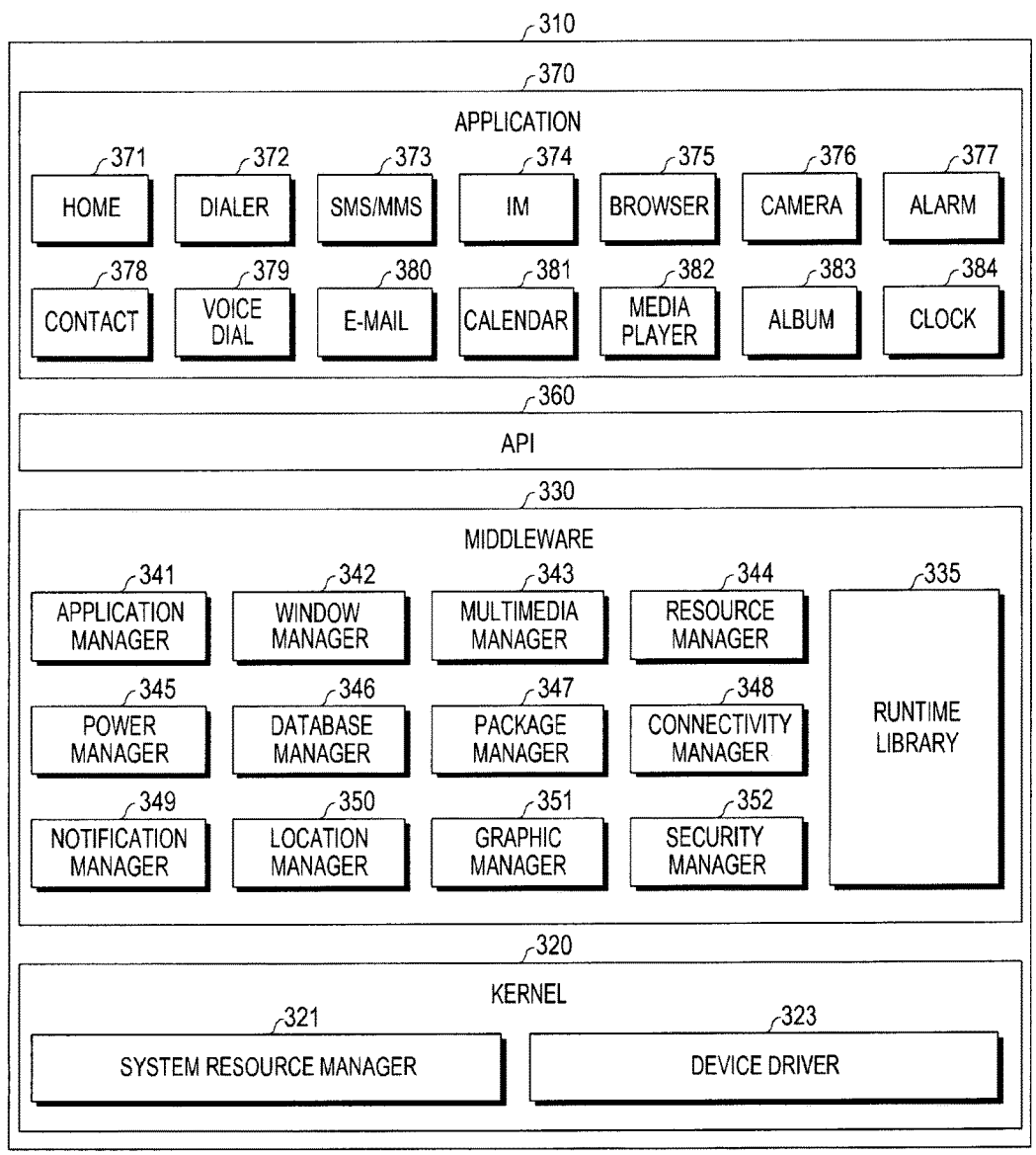
FIG. 3 is a block diagram of a programming module according to various embodiments of the present disclosure.

FIG. 3 is a block diagram of a programming module according to various embodiments of the present disclosure. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be pre-loaded on an electronic device or may be downloaded from an external device (e.g., the electronic device 102 or 104 or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a GUI resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages a graphic effect to be provided to a user or a user interface relating thereto. The security manager 352 provides system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
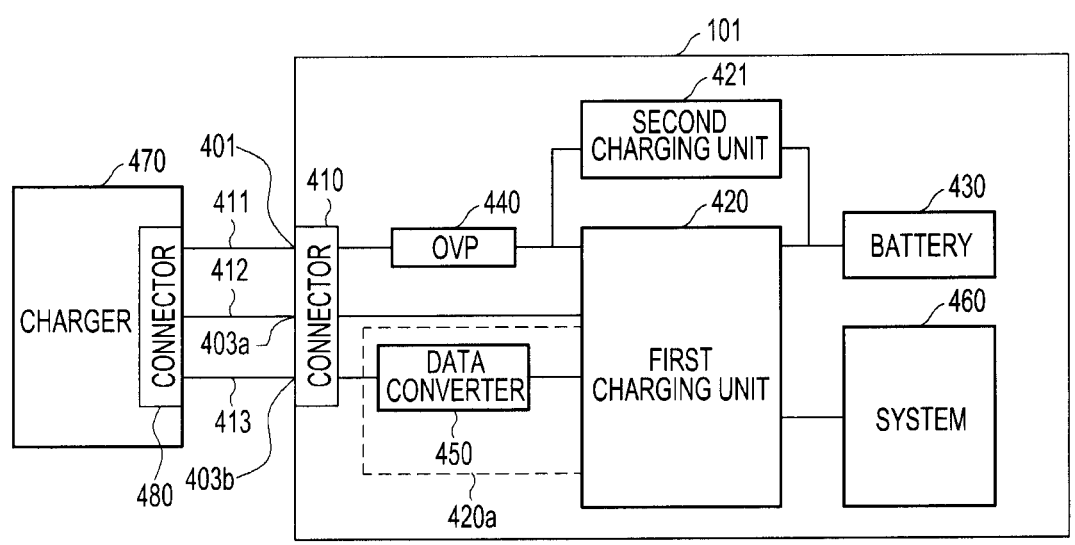
FIG. 4 is a block diagram of an electronic device and a charger according to various embodiments of the present disclosure.

FIG. 4 is a block diagram of an electronic device 101 and a charger 470 according to various embodiments of the present disclosure. Electronic device 101 may include a connector 410 and a first charging unit 420. The electronic device 101 may be connected with charger 470 through the connector 410 and be supplied with power from the charger 470. The connector 410 may include a first terminal 401 to which a voltage is applied from an external device (e.g. charger 470) and a second terminal (403a or 403b) for transmitting and receiving data to and from the external device. (In some cases, both terminals 403a and 403b may be used to exchange data with the external device.) The connector 410 may further include another terminal(s) based on a preset criterion associated with the connector 410, e.g., a criterion described in related standards, in addition to the first and second terminals.

For example, the connector 410 may be configured to be connected with a USB connector that supports a USB type C, and thus, the connector 410 may further include terminals based on a criterion described in standards related to the USB type C. Terminal 403a may be connected with a D+/D− line 412 and used as the second terminal for data transmission and reception. Additionally or alternatively, terminal 403b may be connected to a CC (Configuration Channel) line 413 of the USB connector and used as the second terminal for data transmission and reception. First terminal 401 may be connected with a voltage line $V_{BUS}$ 411 of the USB connector and the voltage is applied to the first terminal from the charger 470. Hereafter, the voltage applied from the charger 470 to the first terminal will be referred to as the "applied voltage". In accordance with battery charging schemes discussed below, the applied voltage may be dynamically adjusted based on various conditions. When the applied voltage is adjusted, it may be referred to as the "adjusted voltage". The applied voltage may be adjusted differently by the charger in response to the receipt of different respective information, as described below. Depending on the information received, the applied voltage may be called adjusted voltage", "first adjusted voltage", "second adjusted voltage", etc., even though the different labels do not necessarily imply different values.

The electronic device 101 may further include a data converter 450 for converting data into a data format that may be transmitted through the CC line 413 to an external device (e.g. charger 470). The data converter 450 is a circuit and may be an element that is separate from the first charging unit 420 or may be included in the first charging unit 420, where the latter configuration is depicted by the dotted line boundary 420a.

The electronic device 101 may further include a protection device 440 which is a circuit such as an over voltage protector (OVP), an over current protector (OCP), an over temperature protector (OTP), a under voltage lock out (UVLO), or the like. (In FIG. 4, the OVP is used as an example.) For example, as shown in FIG. 4, the OVP 440 may be disposed between the first terminal 401 and the first charging unit 420, and if the voltage applied to the first terminal is greater than or equal to a predefined threshold voltage, the voltage may be blocked to protect elements of the electronic device 101. Other protection devices (e.g., OTP, UVLO, OCP, etc.) may also be used to protect the elements of the electronic device 101.

The first charging unit (charging circuit) 420 is a circuit that may charge a battery 430 of electronic device 101 with the power applied to the first terminal 401 from the charger 470. At least one of the power of the battery 430 or the power supplied from the charger 470 may be supplied to a system 460 to drive the system 460. The system 460 may include some or all of the elements included in the electronic device 101 or 201 illustrated in FIG. 1 or 2 and described above.

According to various embodiments of the present disclosure, the first charging unit 420 may charge the battery 430 by using information associated with the battery 430. For example, the first charging unit 420 may obtain first information regarding the voltage of the battery 430 and use this first information to charge the battery 430. Herein, the "voltage of the battery", the "battery voltage" or the "battery output voltage" may be used interchangeably to refer to a current output voltage provided by the battery 430, which is measured by a suitable measuring circuit (not shown). For example, the measuring circuit may employ a known pulse switching scheme or the like to test the battery output voltage using a test load at time intervals interrupting the charging voltage applied to the battery. The first charging unit 420 may obtain second information regarding at least one of charging current of the battery 430, a state of charge (SOC) of the battery 430, a surface temperature of the electronic device 101, a temperature of the battery 430, or consumed current of the battery 430 (all of which are continually measured by suitable measuring means), as well as the first information, and use the obtained second information to adjust a charging voltage and/or current to charge the battery 430. Note that the information associated with the battery 430, included in the second information, is merely an example, and a variety of information associated with the battery 430, available for determining output voltage or output current of the charger 470, may be included in the second information.

The first charging unit 420 may transmit the first information regarding the battery voltage to the charger 470 and receive a voltage adjusted ("the adjusted voltage" noted above) based on the first information. The first charging unit 420 may transmit the first information to the charger 470 through the second terminal 403a or 403b by using a communication unit in the first charging unit 420. (Data converter 450 may be part of this communication unit.) The first charging unit 420 may transmit the first information to the charger 470 by using an element of the electronic device 101 (e.g., the communication interface 170, the I/O interface 150, etc.).

The first charging unit 420 may transmit the second information regarding at least one of the charging current of the battery 430, the SOC of the battery 430, the surface temperature of the electronic device 101, the temperature of the battery 430, or the consumed current of the battery 430 to the charger 470, and receive the adjusted voltage and also an "adjusted current" based on the first information and the second information from the charger 470. The adjusted current may be a constant current, which is controlled (regulated) by the charger 470. Hereafter, when the charger 470 supplies both an adjusted voltage and an adjusted current (e.g. based on the first information and the second information), the charger 470 may be said to supply the "adjusted voltage/current" or the "second adjusted voltage and the adjusted current." (When described using the latter phrase, the afore-described adjusted voltage based only on the first information may be considered a first adjusted voltage, and the second adjusted voltage may be different from, or the same as, the first adjusted voltage.) On the other hand, as noted above, when the charger 470 adjusts and outputs the applied voltage but does not necessarily supply an adjusted current, this will be referred to as the "adjusted voltage" or the "first adjusted voltage".

The charger 470 may receive the first information and/or the second information from device 101 through a terminal for data transmission and reception, included in a connector 480 of the charger 470. The charger 470 may determine a voltage to be supplied to the electronic device 101 based on the first information, and adjust an output voltage of the charger 470 to output the determined voltage. The charger 470 may determine a voltage and current to be supplied to the electronic device 101 based on the first information and the second information, and adjust an output voltage and current of the charger 470 to output the determined voltage and current (i.e., the adjusted voltage/current).

If the adjusted voltage or the adjusted voltage/current is supplied to the first terminal 401 the charger 470, the first charging unit 420 may charge the battery 430 with the adjusted voltage or the adjusted voltage/current. For example, the first charging unit 420 may control an internal voltage converter or switch to charge the battery 430 with the adjusted voltage or the adjusted voltage/current. (Example configurations will be described later in connection with FIGS. 7-11.) Electronic device 101 may further include a second charging unit 421 separated from the first charging unit 420. (The second charging unit may be omitted, as shown later in the examples of FIGS. 7, 9A and 9B.) The first charging unit 420 may charge the battery 430 with the adjusted voltage or the adjusted voltage/current through the second charging unit 421. The second charging unit 421 may charge the battery 430 by using the adjusted voltage or voltage/current applied to the first terminal. A detailed method for charging the battery 430 with the adjusted voltage or voltage/current will be described below.

The electronic device 101 according to various embodiments of the present disclosure may charge the battery 430 with the adjusted voltage or the adjusted voltage/current which, as discussed above, is adjusted by charger 470. In this way, heat generated during charging of the battery 430 may be reduced and the charging efficiency of the battery 430 may be improved. For example, in a conventional electronic device employing an internal voltage converter to reduce an applied voltage based on battery conditions, the voltage converter generates heat. Embodiments described herein may reduce or eliminate such heat by providing information/commands to the external charger to reduce the applied voltage to the electronic device when such battery conditions arise. Using switching, the applied voltage may be routed to battery through a circuit path that bypasses the voltage converter, whereby the voltage generator may not generate as much heat as it would conventionally.

Figure 5:
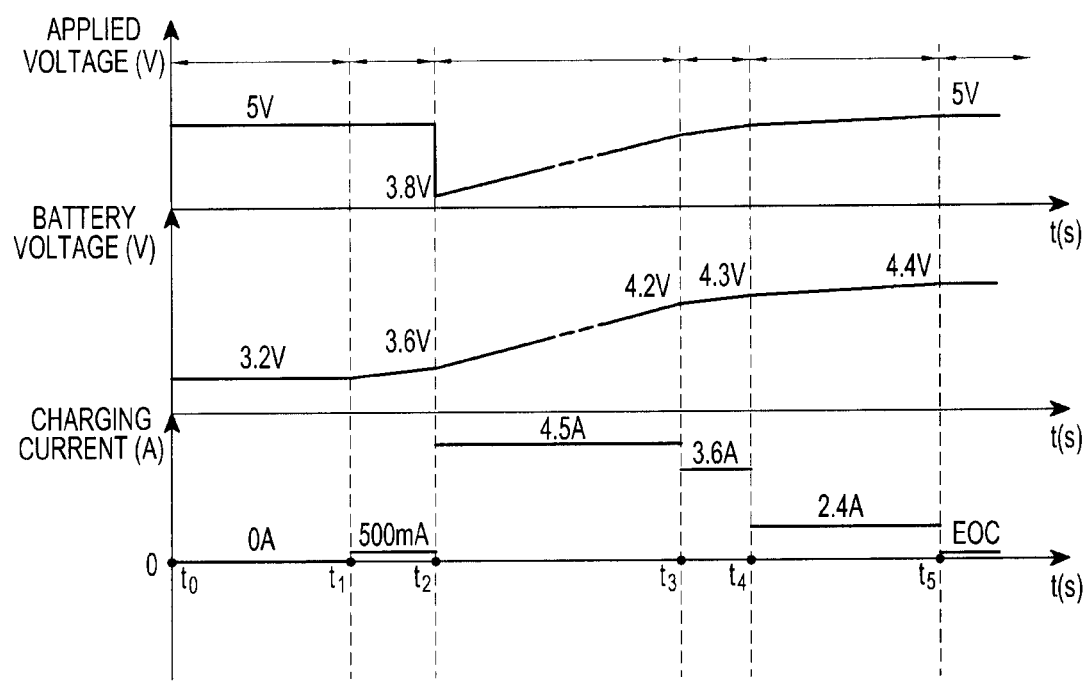
FIG. 5 shows graphs of changes in an applied voltage, a battery voltage, and a charging current according to various embodiments of the present disclosure.

FIG. 5 illustrates graphs of changes in an applied voltage, a battery voltage, and a charging current according to various embodiments of the present disclosure.

The graphs illustrated in FIG. 5 show a change in an applied voltage, a battery voltage, and a charging current of a charger during charging of a battery when the charger is connected to the electronic device 101 at a point in time t1.

According to various embodiments of the present disclosure, the electronic device 101 may perform battery charging by switching between a conventional battery charging scheme in which a fixed voltage is supplied from the charger to charge the battery, and a battery charging scheme in which the above-discussed adjusted voltage (based on the first information) is supplied from the charger to charge the battery. The electronic device 101 may use the conventional battery charging scheme in a period where battery charging with the fixed voltage is needed (e.g., when the battery voltage is close to that expected for a fully charged battery condition).

Herein below, as an example it is assumed that a battery voltage from a point in time t1 to a point in time t2 is less than a first threshold value (e.g. 3.6V) and a battery voltage after a point in time t5 is greater than or equal to a second threshold value (e.g. 4.4V). Here, the first threshold value may be set higher than a final discharge voltage of the battery by a predetermined amount according to characteristics of the battery, the electronic device 101, or the charger. A final discharge voltage typically refers to a voltage at which a battery should not be discharged below to avoid damage to the battery. (A final discharge voltage may be set to a prescribed lower-limit voltage at which battery discharge is considered complete, and is usually chosen so that the maximum useful capacity of the battery is realized.) The second threshold value may be set lower than a fully-charged voltage of the battery by a predetermined amount according to the characteristics of the battery, the electronic device 101, or the charger. The first threshold value and the second threshold value may be set to prescribed values.

When the battery needs to be or should be charged with low current, the electronic device 101 may charge the battery using the conventional battery charging scheme in which the fixed voltage is supplied to charge the battery. For example, if the battery voltage is lowered close to the final discharge voltage as shown from t0 to t2, and if the charger resumes charging after being connected to the electronic device 101 (e.g. at time t1), or if the electronic device 101 reduces the charging current of the battery in a high-temperature or low-temperature environment, then the battery may be charged using the conventional battery charging scheme.

The electronic device 101 may need to control the voltage and charging current of the battery more precisely at a charging termination point in time of the battery when the voltage of the battery increases to close to the fully-charged voltage of the battery, for example, as in a period after t5 (designated End of Charge (EOC)). Thus, the electronic device 101 may use the conventional battery charging scheme in which the applied voltage is fixed at e.g. 5V in a period after t5.

In a period where high-speed charging of the battery is desired or needed, the electronic device 101 may perform battery charging using the above-discussed adjusted voltage from the charger 470 (based on the first information), which hereinafter may be referred to as a first battery charging scheme. The battery charging current may also be regulated as seen in FIG. 5. In the case of the first battery charging scheme, the charging current may be regulated using a current regulating circuit within electronic device 101. In the case of a second battery charging scheme in which the adjusted voltage/current is supplied by charger 470, the charging current may be regulated by charger 470, and may be determined based on the first and/or second information. For example, in the periods from times t2 to t3, t3 to t4, and t4 to t5 where the battery voltage is greater than or equal to the first threshold value 3.6V and is less than the second threshold value 4.4V, the electronic device 101 may use the first battery charging scheme to charge the battery at high speed, to minimize heat generated during high-speed charging of the battery, and to increase the efficiency of the charging. As noted above, heat generated during charging may be minimized by bypassing the internal voltage converter, which is conventionally used for high speed charging.

The electronic device 101 may send a request to the charger 470 for an adjustment of the applied voltage to change the battery charging scheme in a period desiring the high-speed charging. The charger 470 may adjust the voltage applied to the electronic device 101 in response to the request received from the electronic device 101.

The charger 470 may adjust the voltage applied to the electronic device 101 according to the first information received from the electronic device 101. For example, the charger may adjust the applied voltage to a value equal to or positively correlated to a current battery voltage identified based on the first information. In this case, as shown in FIG. 5, as the battery voltage increases by battery charging, the applied voltage from the charger also increases. To ensure that a correct value of the current battery voltage is supplied to the charger, the charger or the electronic device 101 may determine a voltage drop between the terminal 401 (at which the applied voltage is present) and the battery terminals, in which the voltage drop occurring during the supply of the applied voltage may be taken into account. Thus, the charger may apply the adjusted voltage set to a value that is a result of adding the determined voltage drop to the identified current battery voltage.

Accordingly, as described above, the charger 470 may adjust the voltage to be applied to the electronic device 101 according to the first information received from the electronic device 101.

The electronic device 101 may charge the battery by supplying a constant current to the battery determined based on the capacity of the battery. The electronic device 101 may supply a constant current determined based on the battery capacity (i.e., without changing the charging current) in a period where the battery is charged using the first battery charging scheme where the adjusted voltage (based on the first information) is supplied from the charger. In this case, the electronic device 101 may use an internal current control circuit to supply the constant current.

As shown in FIG. 5, the electronic device 101 may also change the charging current based on the change in battery voltage as charging occurs. For example, the electronic device 101 may change the charging current (regulate the current draw to a different value) based on profile information indicating a relationship between a preset battery voltage and current used for charging.

The electronic device 101 may also charge the battery by using a current adjusted by the charger 470 based on second information (and/or the first information). As discussed above, charger 470 may output the adjusted voltage/current by using the first information and/or the second information, where the latter is information regarding at least one of the charging current of the battery, the SOC of the battery, the surface temperature of the electronic device 101, the temperature of the battery, or the consumption current of the battery. As mentioned, this is referred to as a second battery charging scheme. In this scheme, device 101 may send a request to the charger 470 for adjustment of the voltage and the current based on the first information and/or the second information. In an embodiment, the electronic device 101 may compare the State of Charge (SOC) of the battery, the charging current of the battery, the consumption current of the battery, the temperature of the battery, or the surface temperature of the electronic device 101 with a respective threshold value preset for requesting adjustment of the voltage and the current, and send a request for adjustment of the voltage and the current to the charger according to a comparison result.

In an embodiment, the charger may supply the adjusted voltage/current based on preset voltage and current values according to an SOC of the battery. For example, if the SOC of the battery is in a range of about 0% to about 20%, the output current may be preset to 500 mA and the output voltage may be preset to 3.8V; if the SOC of the battery is in a range of about 20% to about 40%, the output current may be preset to 4 A and the output voltage may be preset to 4V, and in this way, the output current and the output voltage may be preset according to the SOC value. The charger may determine the output voltage and the output current according to the SOC value of the battery received from the electronic device 101. The charger may also determine the output current according to the SOC value of the battery and the output voltage based on the first information regarding the voltage of the battery as described above.

The charger may receive information about the charging current or consumption current of the battery from the electronic device 101 and determine the output current of the charger based on the received information. For example, the charger may adjust the output current to a sum of the charging current and the consumption current of the battery. Thus, the charger may increase the output current of the charger if the consumption current of the battery increases, and may reduce the output current of the charger if the consumption current of the battery decreases.

The charger may receive information about the surface temperature of the electronic device 101 from the electronic device 101 and change the output voltage of the charger to optimize the surface temperature of the electronic device 101. For example, if the surface temperature of the electronic device 101 is higher than or equal to 40 degrees, the charger may reduce the output current by about 30%; if the surface temperature of the electronic device 101 is higher than or equal to 45 degrees, the charger may reduce the output current by about 45%. In this manner, the output voltage/current of the charger may be adjusted to optimize the surface temperature of the electronic device 101 based on a preset criterion according to the surface temperature of the electronic device 101. In another embodiment, the temperature of the battery may be used instead of the electronic device 101 temperature the charger adjusts the output voltage.

As such, the charger may adjust the current as well as the voltage according to the first information and the second information related to the battery, which are received from the electronic device 101, and apply the adjusted voltage/current to the electronic device 101. In this case, the electronic device 101 may use the second battery charging scheme, based on the first information and the second information.

As described above, the electronic device 101 may efficiently perform battery charging by switching the above-described battery charging schemes. Herein below, a detailed description will be made of a battery charging scheme in which the electronic device 101 charges the battery with a voltage adjusted by the charger based on the first information related to the battery or voltage and current adjusted by the charger based on the first information and the second information.

Figure 6:
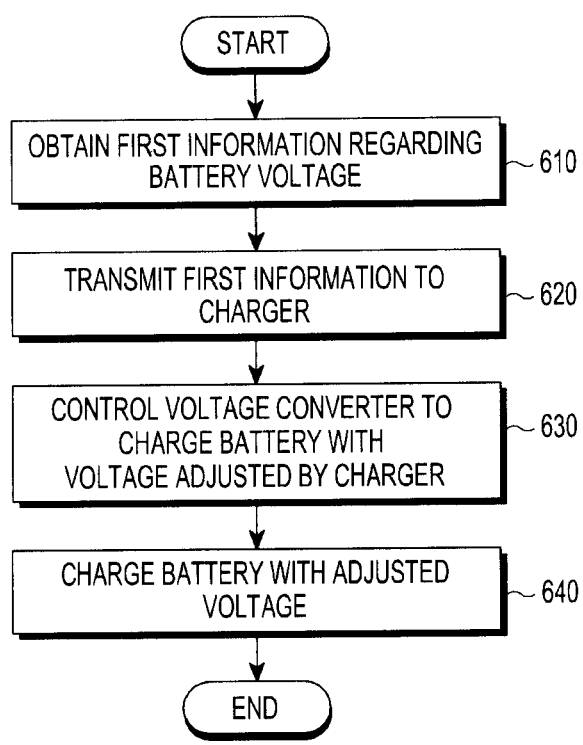
FIG. 6 is a flowchart of a method for charging a battery according to various embodiments of the present disclosure.
Figure 7:
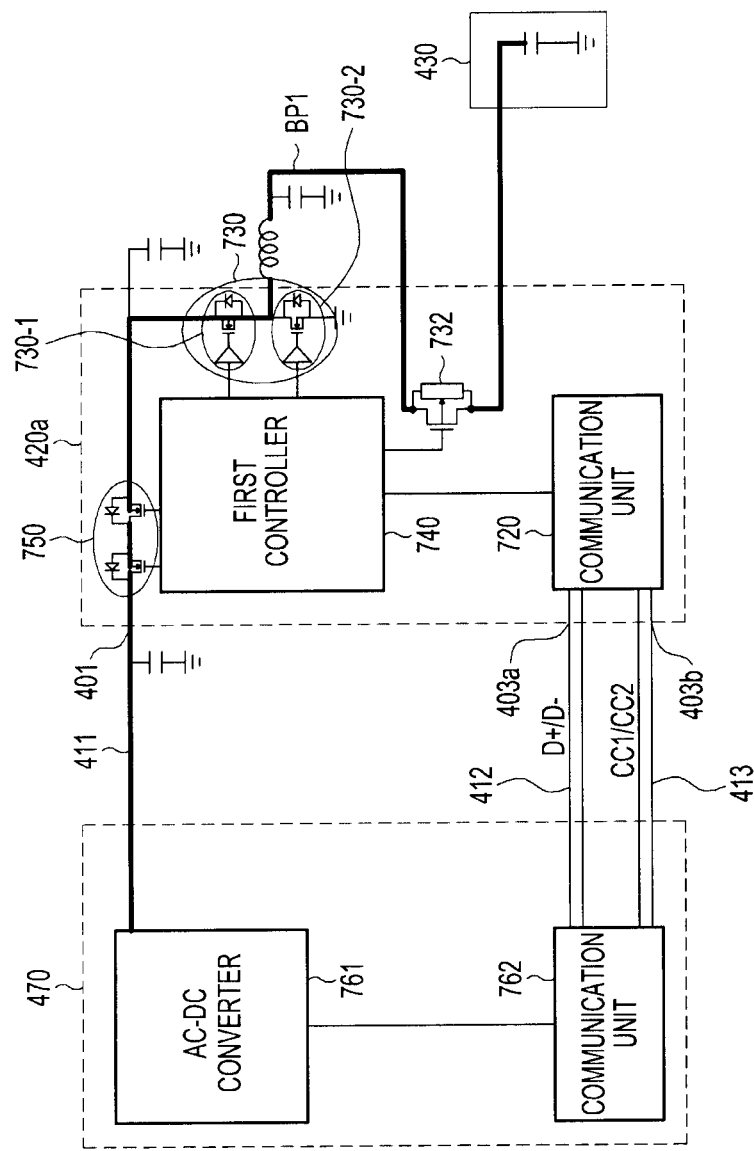
FIG. 7 is a circuit diagram of a charger, and circuit elements of the electronic device according to various embodiments of the present disclosure.

FIG. 6 is a flowchart of a method for charging a battery according to various embodiments of the present disclosure. FIG. 7 is a circuit diagram of an example charger and first charging unit for charging the battery of the electronic device 101 of FIG. 4.

Referring collectively to FIGS. 6 and 7, in operation 610, a first controller 740 of a first charging unit 420*a* may obtain first information regarding a voltage of battery 430. Battery 430 may be electrically connected with first charging unit 420*a* that may obtain the first information. In operation 610, first charging unit 420*a* may further obtain the second information regarding at least one of the charging current of the battery, the SOC of the battery, the surface temperature of the electronic device 101, the temperature of the battery, or the consumption current of the battery.

In operation 620, a first controller (also referred to as first controller circuit) 740 may be a control and processing circuit that may transmit the first information to charger 470 through the second terminal 403a or 403b of connector 410 by using a communication unit 720 of the first charging unit 420a. (Communication unit 720 may include the data converter 450 of FIG. 4.) The first controller 740 may transmit the second information to charger 470 through the second terminal. Charger 470 may apply a voltage to the first terminal 401 of the connector 410 through voltage line 411 and transmit and receive data to and from the electronic device 101 through the second terminal.

A second switch 750 may be disposed between a voltage converter 730 and the first terminal 411. (Although not shown in FIG. 7, a protection device 440 may also be included between first terminal 411 and first charging unit 420a.) The first controller 740 may turn second switch 750 on or off to control voltage supply to the voltage converter 730. For example, to charge battery 430, the first controller 740 may control the voltage to be supplied along a bypass path BP1 (the thicker black line in the figure) through the voltage converter 730 by turning on the second switch 750. When battery charging is complete, second switch 750 may be turned off.

In FIG. 7, it is assumed that the connector 410 is connected to a USB connector of the charger 470 that supports a USB type C. In this case, the second terminal is connected to the D+/D− line 412 or CC lines CC1 and CC2 413 of the USB connector. Thus, the communication unit 720 may transmit the first information and/or the second information related to the battery to a communication unit 762 of the charger 470 through the D+/D− line 412 or the CC lines CC1 and CC2 413.

Moreover, when the first controller 740 transmits the first information or the second information through the CC line, communication unit 720 may convert a data format of the information into a data format that is transmittable through the CC line by.

While the first and/or second information is illustrated as being transmitted through the communication unit 720, it may be transmitted to the charger 470 through an element of the electronic device 101 (e.g., the communication interface 170, the I/O interface 150, etc.).

The first controller 740 may send a request for adjustment of the voltage to be applied to the first terminal to the charger 470 based on the obtained first information. The first controller 740 may send a request for adjustment of the voltage and the current to be applied to the first terminal to the charger 470 based on the obtained first information and second information. The first controller 740 may determine whether to switch the battery charging scheme based on the obtained first information or second information as described with reference to FIG. 5. For example, the first controller 740 may determine based on the first information or the second information whether to charge the battery with low current by using the conventional battery charging scheme or to charge the battery at high speed without having to control the voltage and the current of the battery more precisely.

If determining that the voltage of the battery 430 is greater than or equal to a preset first threshold value and is less than a second threshold value based on the first information, the first controller 740 may control the communication unit 720 to send a request for adjustment of the voltage to be applied to the first terminal to the charger 470. If identifying the surface temperature of the electronic device 101 based on the second information and determining that high-speed charging is possible based on the identified surface temperature of the electronic device 101, the first controller 740 may control the communication unit 720 to send a request for adjustment of the voltage and the current to be applied to the first terminal to the charger 470. If determining that adjustment of the voltage and the current is needed based on at least one of the SOC of the battery, the charging current of the battery, or the consumption current of the battery identified based on the second information, the first controller 740 may send a request for adjustment of the voltage and the current to be applied to the first terminal to the charger 470.

In operation 630, if the voltage adjusted by the charger 470 based on the first information is applied to the first terminal, the first controller 740 may control the voltage converter 730 to avoid additional voltage conversion. The charger 470 may include an analog current (AC)-digital current (DC) converter 761 for converting an AC voltage supplied from a power source to a DC voltage and the communication unit 762 for transmitting and receiving data to and from an external device. The charger 470 may receive the first information received through the communication unit 762. The charger 470 may determine a voltage to be supplied to the electronic device 101 based on the first information, and adjust the voltage supplied to the electronic device 101 to the determined voltage through the AC-DC converter 761. The charger 470 may apply the adjusted voltage to the first terminal 401.

The first controller 740 may control the voltage converter 730 to bypass the adjusted voltage applied to the first terminal, so that the voltage applied to the first terminal may be directly supplied to the battery 770 through bypass path BP1 (which includes a path within voltage converter 730 and a path through switch 732). For example, as shown in FIG. 7, if the voltage converter 730 is a buck converter, a first element 730-1 in the buck converter directly connected to the first terminal may be turned on and a second element 730-2 connected to the first element may be turned off. In this way, as the voltage converter 730 is controlled to avoid additional voltage conversion, the adjusted voltage applied to the first terminal may bypass the voltage converter 730 without being converted by the voltage converter 730.

In operation 640, the first controller 740 may charge the battery 430 with the adjusted voltage bypassing the voltage converter 730. When the voltage and the current adjusted based on the first information and the second information are applied to the first terminal, the first controller 740 may operate identically as just described for operations 630 and 640. In this way, the first controller 740 may minimize heat generated during high-speed battery charging and improve charging efficiency.

Figure 8:
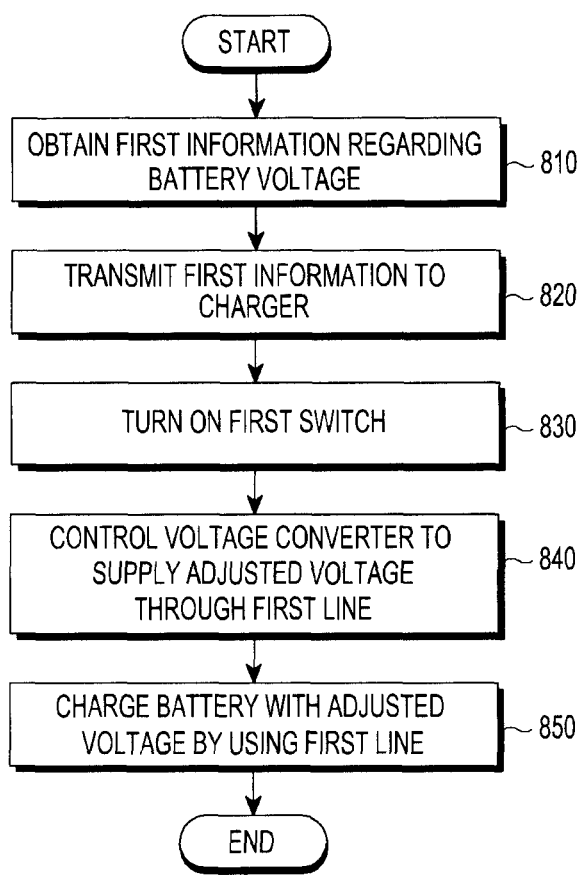
FIG. 8 is a flowchart of a method for charging a battery by using a first switch according to various embodiments of the present disclosure.
Figure 9A:
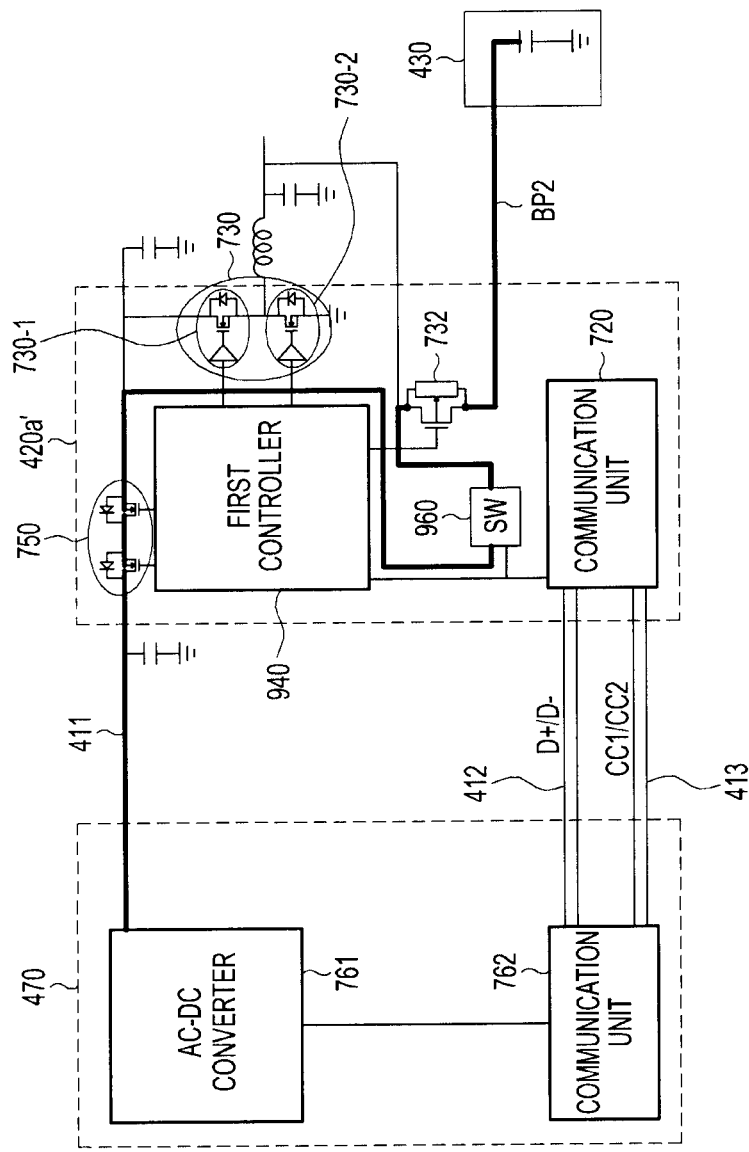
FIG. 9A is a circuit diagram of a charger, and circuit elements of the electronic device that charge a battery by using a first switch according to various embodiments of the present disclosure.
Figure 9B:
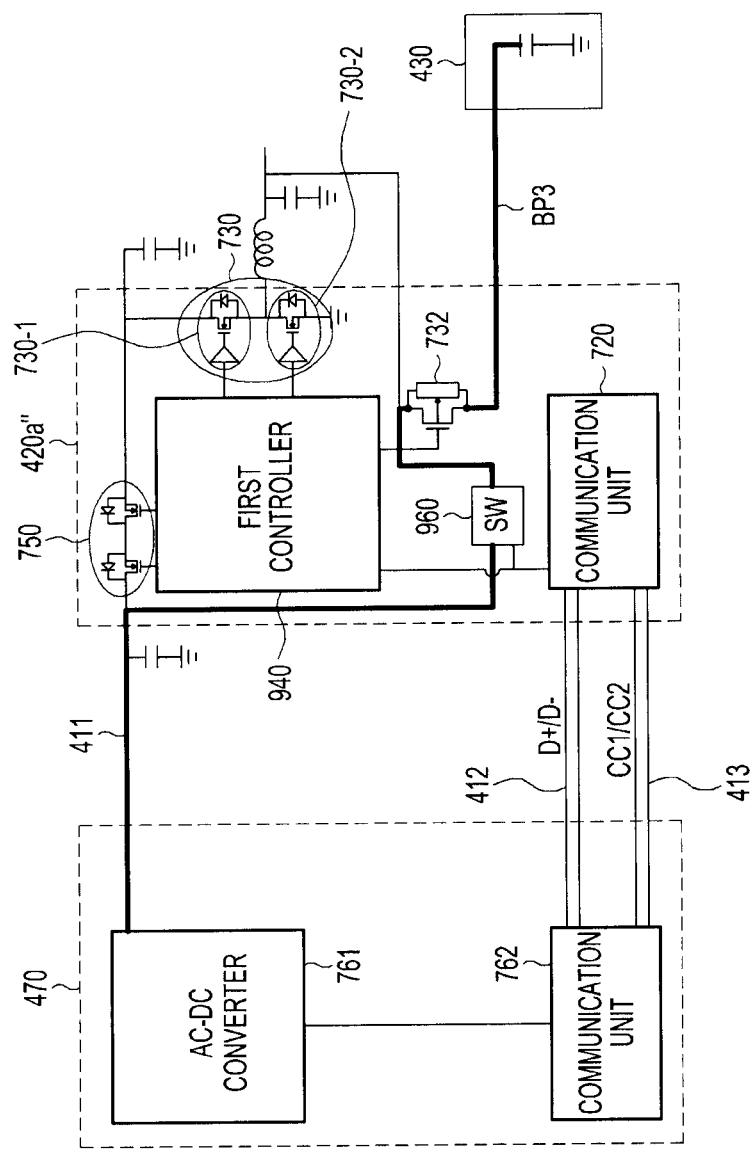
FIG. 9B is a circuit diagram of a charger, and circuit elements of the electronic device, that charge a battery by using a first switch according to various embodiments of the present disclosure.

FIG. 8 is a flowchart of a method for charging a battery by using a first switch according to various embodiments of the present disclosure. FIGS. 9A and 9B are respective circuit diagrams of an example charger and example circuit elements of the electronic device of FIG. 4, that charge a battery using the method of FIG. 8. Operation 810 of obtaining the first information or the second information related to the battery and operation 820 of transmitting the first information or the second information to the charger are identical to operation 610 and operation 620. Elements shown in FIGS. 9A and 9B are identical to each other except for a connection configuration of a first switch 960 and thus will not be described separately. As shown in FIG. 9A, a first charging unit 420a' includes the first switch 960 connected with an output terminal of second switch 750 and thus may be connected to voltage converter 730 in parallel. As shown in FIG. 9B, a first charging unit 420a" includes the first switch 960 connected with an input terminal of the second switch 750 and thus may be connected to the second switch 750 and the voltage converter 730 in parallel. In this way, the first switch 960 may be disposed in a first charging unit 420a' or 420a" so that an adjusted voltage applied by a charger 470 is supplied to the battery by using a first line connected through the first switch 960, i.e., part of a bypass path BP2 or BP3, instead of through a line through the voltage converter 730 as in FIG. 7.

In operation 830, if the voltage adjusted by the charger 470 based on the first information is applied to the first terminal, the first controller 940 may turn on the first switch 960. The first controller 940 may turn on the first switch 960 so that the voltage applied to the first terminal by the charger 470 is supplied to the battery through the first line connected through the first switch 960.

Also, as shown in FIG. 9B, if the first switch 960 is disposed in parallel to the second switch 750 and the voltage converter 730, the first controller 940 may turn off the second switch 750 so that the voltage is not supplied through the line connected through the second switch 750.

In operation 840, the first controller 940 may control the voltage converter 730 to supply the adjusted voltage through the first line connected through the first switch 960. For example, as described in connection with FIG. 7, when the voltage converter 730 may include a buck converter, both the first element 730-1 and a second element 730-2 in the buck converter are turned off, so that the adjusted voltage applied through the first terminal is not supplied through the line through the voltage converter 730.

In operation 850, the first controller 940 may charge the battery 430 with the adjusted voltage by using the first line connected through the first switch 960. When the voltage and the current adjusted based on the first information and the second information are applied to the first terminal, the first controller 940 may operate identically to perform operations 830 through 850. In this way, the first controller 940 may minimize heat generated during high-speed battery charging and improve charging efficiency.

Figure 10:
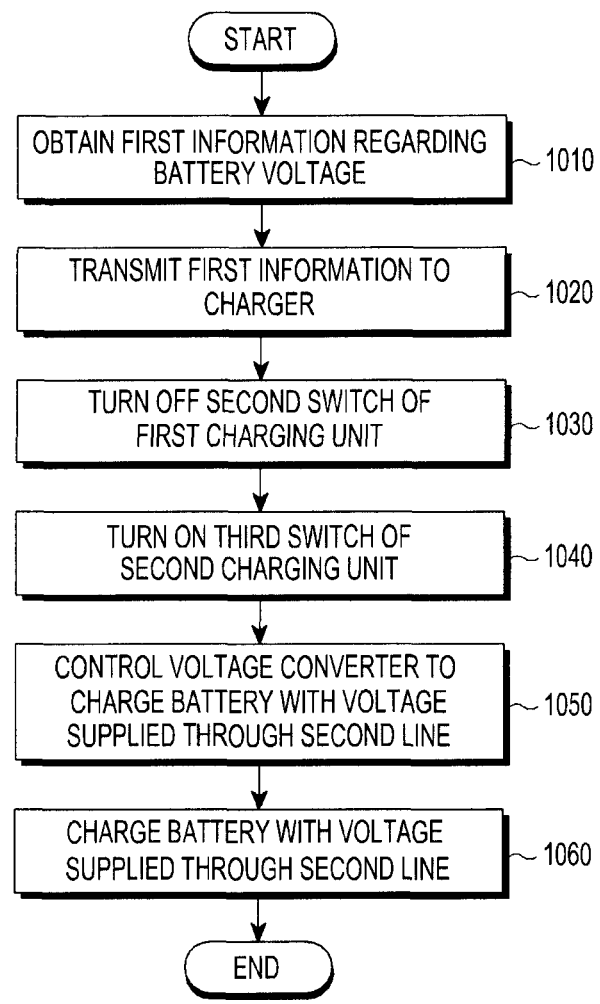
FIG. 10 is a flowchart of a method for charging a battery by using a second charging unit according to various embodiments of the present disclosure.
Figure 11:
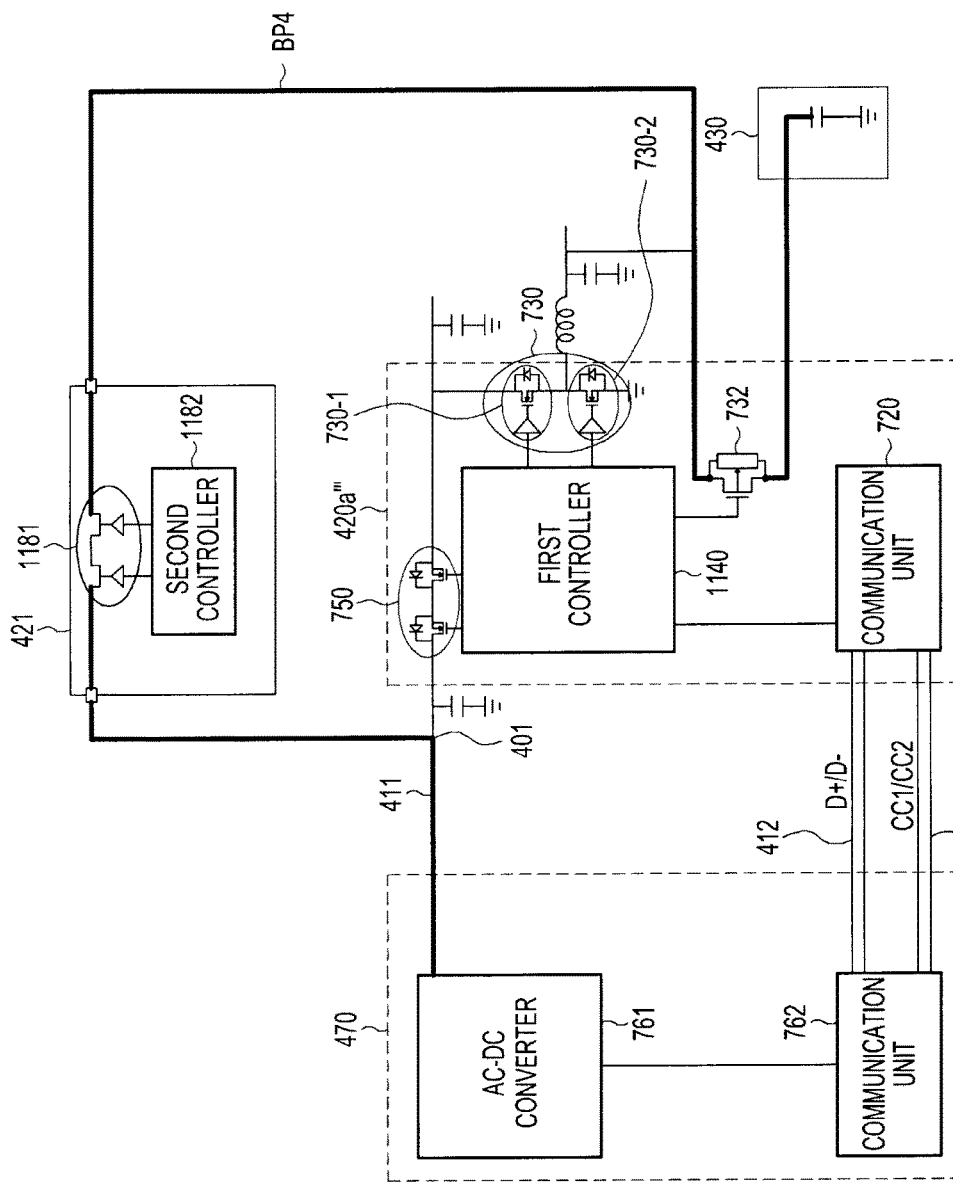
FIG. 11 is a circuit diagram of a charger, and circuit elements of the electronic device that charge a battery by using a second charging unit according to various embodiments of the present disclosure.

FIG. 10 is a flowchart of a method for charging a battery by using a second charging unit according to various embodiments of the present disclosure. FIG. 11 is a circuit diagram of an example charger, and example circuit elements of the electronic device of FIG. 4, that charge a battery using the method of FIG. 10.

Operation 1010 of obtaining the first information or the second information related to the battery and operation 1020 of transmitting the first information or the second information to the charger are identical to operation 610 and operation 620; and elements shown in FIG. 11 are identical to those of FIG. 7 except for a second charging unit 421 and thus will not be described separately. The second charging unit 421 may charge battery 430 by using a voltage or a current applied to the first terminal.

As shown in FIG. 11, an input terminal of the second charging unit 421 may be connected with the first terminal 401 and an output terminal of the second charging unit 421 may be connected with an output terminal of voltage converter 730 of first charging unit 420a'''. In this way, a voltage applied to the first terminal 401 may be supplied directly to the battery 430 through the second charging unit 421, via a bypass path BP4, without passing through the voltage converter 730.

The second charging unit ("second charging circuit") 421 may include a third switch 1181 connected with the first terminal 401 and a second controller 1182 that may control turning-on or turning-off of the third switch 1181. The second controller 1182 may control voltage supply to the battery 430 using the second line connected through the third switch 1181 by controlling turning on or turning off of the third switch 1181. For example, if the electronic device 101 charges the battery 430 through the first charging unit 420a''', the second controller 1182 may turn off the third switch 1181 and prevent voltage supply to the battery 430 through the second line. On the other hand, if the electronic device 101 charges the battery 1170 through the second charging unit 421, the second controller 1182 may turn on the third switch 1181 and control a voltage to be supplied to the battery 430 through the second line. A process of supplying the voltage to the battery 430 through the second line is as described below.

In operation 1030, if the voltage adjusted by the charger 470 based on the first information is applied to the first terminal 401, the first controller 1140 may turn off the second switch 750 so that the voltage is supplied to the battery 430 through the bypass path BP4 (second line). By turning off the second switch 750, the first controller 1140 may prevent a voltage from being supplied to the first charging unit 420a''' and control the voltage to be supplied through the second charging unit 421.

In operation 1040, the second controller 1182 may turn on the third switch 1181. By turning on the third switch 1181, the second controller 1182 may control the voltage to be supplied to the battery 430 through the bypass path BP4.

In operation 1050, the first controller 1140 may control the voltage converter 730 to charge the battery 430 with the voltage supplied to the first charging unit 420a''' through the second line (bypass path BP4). For example, the first controller 1140 may control the voltage converter 730, so that the voltage supplied to the first charging unit through the second line is not supplied to the voltage converter 730. To this end, voltage converter 730 may operate identically as described above.

In operation 1060, the first controller 1140 may charge the battery 430 with the adjusted voltage supplied through the second line. When the voltage and the current adjusted based on the first information and the second information are applied to the first terminal, the first controller 1140 may operate identically to that described above for operations 1030 to 1060. In this way, the first controller 1140 may minimize heat generated during high-speed battery charging and improve charging efficiency.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner, or at least some of the operations may be executed in different orders, and may be omitted, or other operations may be added.

According to various embodiments of the present disclosure, there is provided a storage medium having stored therein instructions that are configured to cause at least one processor, when executed by the at least one processor, to perform at least one operation included in a battery charging method by an electronic device which includes a connector including a first terminal to which a voltage is applied by an external device and a second terminal for transmitting and receiving data and a first charging unit configured to charge a battery connected to the electronic device by using the voltage applied to the first terminal, the battery charging method including obtaining first information regarding a voltage of the battery, transmitting, by a communication unit of the first charging unit, the first information to a charger connected with the connector through the second terminal, and charging the battery with an adjusted voltage by controlling a voltage converter of the first charging unit, if a voltage adjusted by the charger based on the first information is applied to the first terminal.

According to various embodiments of the present disclosure, a battery charging method and an electronic device may be provided which shorten a charging time, minimize heat emission, and improve charging efficiency by using information related to the battery.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

What is claimed is:
1. An electronic device comprising:
a connector comprising a first terminal to which a voltage is applied by charger and a second terminal for transmitting and receiving data; and
a first charging circuit configured to charge a battery of the electronic device by using the applied voltage,
wherein the first charging circuit comprises:
a communication circuit configured to transmit information related to the battery through the second terminal; and
a voltage converter configured to convert a voltage supplied to the battery; and
a first controller circuit configured to:
obtain first information regarding a voltage of the battery, control the communication circuit to transmit the first information to the charger connected with the connector, and
when a voltage adjusted based on the first information by the charger is applied to the first terminal, control the voltage converter to charge the battery using the voltage adjusted based on the first information.

2. The electronic device of claim 1, wherein the first controller circuit is further configured to obtain second information regarding at least one of a charging current of the battery, a state of charge (SOC) of the battery, a surface temperature of the electronic device, a temperature of the battery, or a consumption current of the battery and control the communication circuit to transmit the second information to the charger.

3. The electronic device of claim 2, wherein the first controller circuit is further configured to:
when a voltage and a current which are adjusted based on the first information and the second information by the charger are applied to the first terminal, control the voltage converter to charge the battery using the voltage and the current adjusted based on the first information and the second information.

4. The electronic device of claim 1, wherein the first controller circuit is further configured to send a request for adjustment of the voltage to be applied to the first terminal to the charger, when it is determined that the voltage of the battery is higher than or equal to a first threshold value and is less than a second threshold value based on the first information.

5. The electronic device of claim 1, wherein the first controller circuit is further configured to control the voltage converter to provide a bypass path through which the voltage adjusted based on the first information is supplied to the battery.

6. The electronic device of claim 1,
wherein the first charging circuit further comprises a first switch connected with the voltage converter in parallel, and
wherein the first controller circuit is further configured to:
turn on the first switch when the voltage adjusted based on the first information is applied to the first terminal, and
control the voltage converter to supply the voltage adjusted based on the first information to the battery by using a first line connected through the first switch.

7. The electronic device of claim 1,
wherein the first charging circuit further comprises a second switch disposed between the first terminal and the voltage converter, and
wherein the first controller circuit is further configured to control supply of the voltage adjusted based on the first information to the voltage converter by turning on or off the second switch.

8. The electronic device of claim 7, further comprising a second charging circuit configured to charge the battery by using the applied voltage,
wherein the second charging circuit comprises:
a third switch connected with the first terminal; and a second controller circuit configured to control supply of the applied voltage to the battery by using a second line connected through the third switch by turning the third switch on or off.

9. The electronic device of claim 8,
wherein the first controller circuit is further configured to:
when the voltage adjusted based on the first information is applied to the first terminal, turn off the second switch and control the voltage converter, to supply the voltage adjusted based on the first information to the battery by using the second line, and
wherein the second controller circuit is further configured to:
when the voltage adjusted based on the first information is applied to the first terminal, turn on the third switch to supply the voltage adjusted based on the first information to the battery by using the second line.

10. The electronic device of claim 1, wherein the connector is further configured to be connected with a universal serial bus (USB) connector that supports a USB type C.

11. The electronic device of claim 10, wherein the second terminal is connected with a configuration channel (CC) line or D+/D− line of the USB connector to transmit and receive data.

12. The electronic device of claim 10, further comprising a data converter configured to convert a format of the data into a data format transmittable through a configuration channel (CC) line of the USB connector to transmit and receive data through the CC line.

13. The electronic device of claim 12, wherein the first controller circuit is further configured to convert a data format of the first information into the data format transmittable through the CC line of the USB connector through the data converter, when the second terminal is connected to the CC line.

14. A battery charging method by an electronic device which comprises a connector comprising a first terminal to which a voltage is applied by a charger and a second terminal for transmitting and receiving data and a first charging circuit configured to charge a battery of the electronic device by using the applied voltage, the battery charging method comprising:
obtaining first information regarding a voltage of the battery;
transmitting the first information to the charger connected with the connector, through the second terminal; and
when a voltage adjusted based on the first information by the charger is applied to the first terminal, charging the battery using the voltage adjusted based on the first information.

15. The battery charging method of claim 14, further comprising obtaining second information regarding at least one of a charging current of the battery, a state of charge (SOC) of the battery, a surface temperature of the electronic device, a temperature of the battery, or a consumption current of the battery and transmitting the second information to the charger.

16. The battery charging method of claim 15, wherein the charging of the battery comprises:
when a voltage and a current which are adjusted based on the first information and the second information by the charger are applied to the first terminal, charging the battery using the voltage and the current adjusted based on the first information and the second information.

17. The battery charging method of claim 14, further comprising sending a request for adjustment of the voltage to be applied to the first terminal to the charger, when it is determined that the voltage of the battery is higher than or equal to a first threshold value and is less than a second threshold value based on the first information.

18. The battery charging method of claim 14, wherein the charging of the battery using the voltage adjusted based on the first information comprises providing a bypass path through which the voltage adjusted based on the first information is supplied to the battery.

19. The battery charging method of claim 14, wherein the charging of the battery using the voltage adjusted based on the first information comprises:
turning on a first switch of the first charging circuit connected with a voltage converter of the first charging circuit, in parallel when the voltage adjusted based on the first information is applied to the first terminal; and
supplying the voltage adjusted based on the first information to the battery by using a first line connected through the first switch.

20. The battery charging method of claim 14, wherein the charging of the battery using the voltage adjusted based on the first information comprises:
when the voltage adjusted based on the first information is applied to the first terminal, turning off a second switch of the first charging circuit, disposed between the first terminal and a voltage converter of the first charging circuit;
when the voltage adjusted based on the first information is applied to the first terminal, turning on a third switch of a second charging circuit connected with the first terminal, wherein the second charging circuit is included in the electronic device and charges the battery by using the voltage adjusted based on the first information; and
supplying the voltage adjusted based on the first information to the battery by using a second line connected through the third switch.

* * * * *